(12) United States Patent
Poterek et al.

(10) Patent No.: US 6,687,638 B2
(45) Date of Patent: Feb. 3, 2004

(54) INSPECTION EQUIPMENT INTEGRITY ENHANCEMENT SYSTEM

(75) Inventors: Michael G. Poterek, Buffalo Grove, IL (US); Mike E. Geddis, Plymouth, MN (US); Martin Lymn, Long lake, MN (US); Mike Teasdale, Edina, MN (US)

(73) Assignee: General Hills, Inc., Minneapolis, MN (US)

( * ) Notice: Subject to any disclaimer, the term of this patent is extended or adjusted under 35 U.S.C. 154(b) by 172 days.

(21) Appl. No.: 09/927,845

(22) Filed: Aug. 10, 2001

(65) Prior Publication Data

US 2003/0061858 A1 Apr. 3, 2003

(51) Int. Cl.⁷ .............................................. G01G 23/01
(52) U.S. Cl. ..................... 702/108; 73/1.13; 702/116; 702/121; 702/122; 204/551
(58) Field of Search ................................ 702/108, 101, 702/113, 115, 116, 121, 122, 104, 105; 700/305, 302, 230; 73/1.13, 1.01; 177/50; 209/551, 548, 552, 555, 576, 577, 587, 592; 198/339.1, 340, 341.01, 341.03, 341.05, 341.07, 341.08

(56) References Cited

U.S. PATENT DOCUMENTS

| | | | | |
|---|---|---|---|---|
| 3,564,410 A | * | 2/1971 | Webb .......................... 324/172 |
| 4,498,007 A | * | 2/1985 | Schwarzmann ......... 250/390.03 |
| 4,589,554 A | * | 5/1986 | Edelbruck et al. ...... 209/551 X |
| 4,596,331 A | * | 6/1986 | Edelbruck et al. ...... 209/551 X |
| 5,027,662 A | * | 7/1991 | Titlow et al. ........... 73/861.356 |
| 5,233,312 A | * | 8/1993 | Duft et al. .................... 330/259 |
| 5,825,877 A | * | 10/1998 | Dan et al. ..................... 705/54 |
| 2001/0038674 A1 | * | 11/2001 | Trans .......................... 375/355 |
| 2002/0165636 A1 | * | 11/2002 | Hasan ......................... 700/121 |
| 2002/0188429 A1 | * | 12/2002 | Martis ......................... 702/189 |

FOREIGN PATENT DOCUMENTS

JP  9-292268  * 11/1997  .......... G01D/21/00

OTHER PUBLICATIONS

Derwent–Acc–No.: 1980–E2338C Abstract of SU 684320 A Sep. 1979 Eroslkin et al "Appts. for Dispensing Bulk Material by Weight–Using Logic Circuit Completed by Pointer of Weighing Scales Directing Motor Driving Supply and Dispensing Belts".*

* cited by examiner

Primary Examiner—Thomas P. Noland
(74) Attorney, Agent, or Firm—John A. O'Toole; Douglas J. Taylor; Bradley Forrest (57) ABSTRACT

An inspection equipment integrity system uses independent sensors and processing capabilities to determine the integrity of inspection equipment. The sensors detect the presence of packages at predetermined positions. The system further receives input from the inspection equipment regarding decisions made during inspection of the packages. The system uses the position information and inputs from the inspection equipment to determine the integrity of the inspection equipment. A further sensor determines the integrity of inspection equipment used to redirect packages based on decisions made by the inspection equipment.

20 Claims, 6 Drawing Sheets

INSPECTION EQUIPMENT INTEGRITY ENHANCEMENT SYSTEM

FIELD OF THE INVENTION

The present invention relates to inspection equipment, and in particular to an inspection equipment integrity enhancement system.

BACKGROUND OF THE INVENTION

Inspection equipment automates the inspection of physical items and makes decision on whether each item passes or fails an inspection. A checkweigher is one type of inspection equipment that determines whether a package, such as a box of cereal, meets minimum weight requirements. Packages that weigh too little, result in a reject decision being made. A reject decision then triggers a device to move the package off a main conveyor belt and into a reject bin.

The weighing of the package takes place while the package is moving on the conveyor belt. If packages are too close together, or are skewed on the conveyor belt, they may not be weighed or the weight detected may not be accurate. A decision to accept or reject the package may also be the wrong decision. Wrong decisions can make consumers unhappy, leading to expense in replacing product and potential loss of market share.

There is a need to determine if inspection equipment is operating properly. There is a further need to determine if intended actions directed by the inspection equipment are properly executed. There is yet a further need to determine if items being inspected by the inspection equipment are correctly provided to the inspection equipment.

SUMMARY OF THE INVENTION

An inspection equipment integrity system uses independent sensors and processing capabilities to determine the integrity of inspection equipment. The sensors detect the presence of packages at predetermined positions in one embodiment. The system further receives input from the inspection equipment regarding decisions made during inspection of the packages. The system uses the position information and inputs from the inspection equipment to determine the integrity of the inspection equipment. Further sensors determine the integrity of inspection equipment used to redirect packages based on decisions made by the inspection equipment.

In one embodiment, the inspection equipment comprises a checkweigher system that weighs packages while moving on a conveyor belt. If a package is out of the correct weight range, it is moved off the conveyor belt into a reject bin by a solenoid controlled air blast. Three photo eyes are used to determine whether the package is skewed on the belt, and whether the package proceeds on the conveyor belt if accepted or is properly sent to the reject bin. A fourth sensor detects air pressure to ensure that a sufficient air blast is available for removal of the package from the main conveyor. Inputs received from the checkweigher include whether a decision was made to accept or reject the package. Using information from the photo eyes and the inputs from the checkweigher, a decision is made regarding the integrity of the checkweigher and action taken.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into multiple sections. A first section describes a block diagram of the components of an inspection or measurement system coupled with an integrity checking system. A second section describes control algorithms implemented by the integrity checking system. A third section describes the timing of the checks with reference to a timing chart, and a fourth section provides a description of user interaction, setting up, and configuration of an inspection measurement system. These sections are followed by a conclusion.

Figure 1:
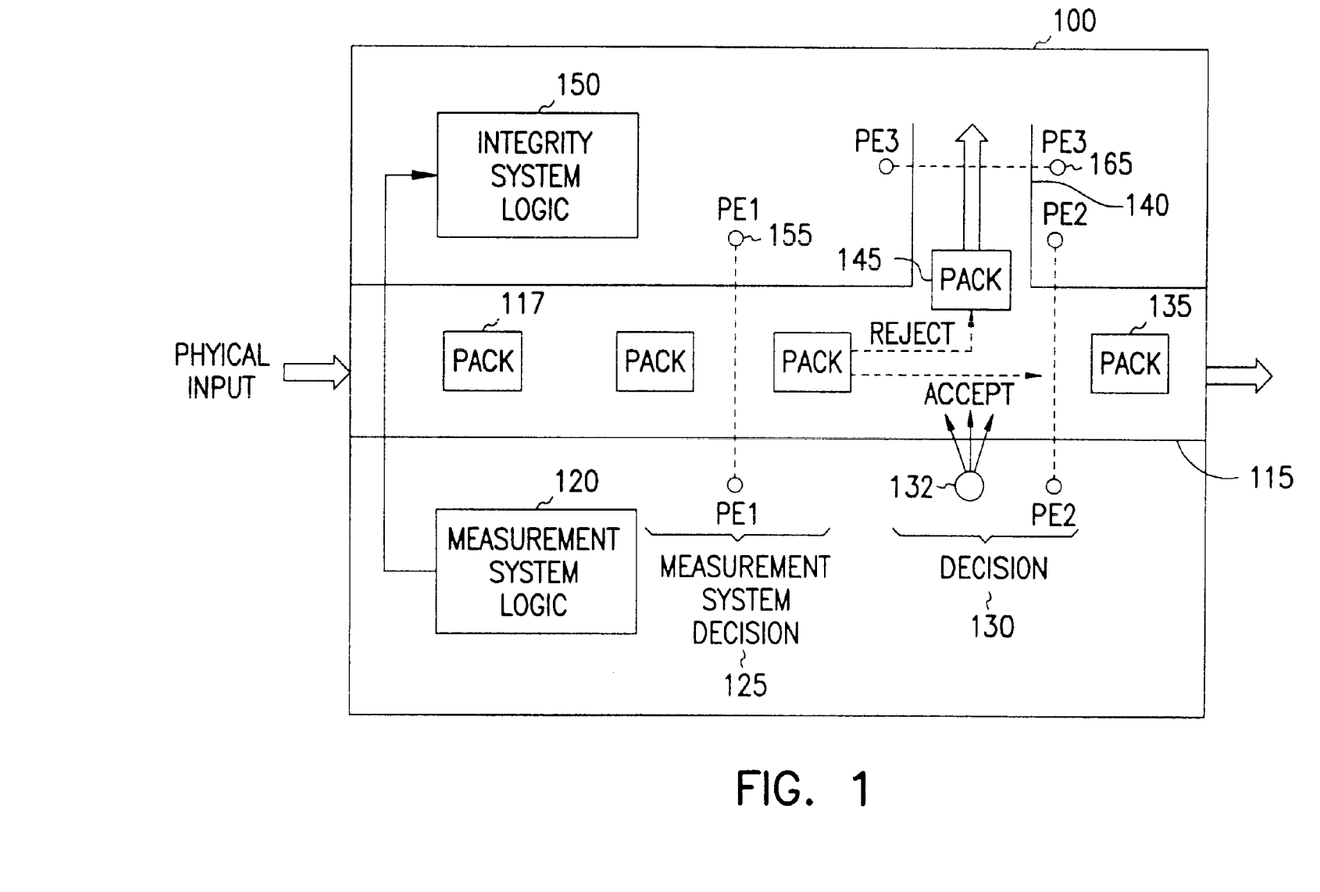
FIG. 1 is a block diagram of a measurement system and an integrity system for measuring the integrity of the measurement system.

A measurement or inspection system and integrity checking system is indicated at 100 in FIG. 1. Operation of the inspection system components are first described to provide context for operation of the integrity checking system which is designed to determine if the inspection system is correctly operating. The inspection system in one embodiment is a checkweigher for packages. The checkweigher determines whether the weight of a package or pack is within acceptable limits. A conveyor belt or other mechanism 115 is used to move packs 117 through the checkweigher. Measurement system logic 120 controls a weighing zone 125 to measure the weight of a moving pack on conveyor 115 and makes a decision regarding whether the pack weight is within acceptable limits. The measurement system logic makes the decision at 130 based on the weight of the package. A reject device such as a solenoid actuated nozzle 132 provides a blast of air to reject packages outside the acceptable weight limits. An accepted package 135 travels down the production conveyor belt for further processing. A reject conveyor belt or chute 140 is used to convey rejected packages 145 down a reject path to a reject bin.

Integrity system logic 150 is implemented in a programmable logic controller (PLC) in one embodiment to check the integrity of the measurement system. It is implemented by general purpose computers and software, or by dedicated hardware in further embodiments. The integrity system logic 150 is implemented independently of the measurement system logic and receives inputs from the checkweigher, such as a checkweigher running signal, and from a plurality of sensors such as photo-eyes. A first photo-eye and reflector combination, PE1 155, detects the presence of a package in the checkweigher weighing zone 125, generically referred to as the measurement zone. A second photo-eye and reflector combination, PE2 160, is placed where an accepted package continues down the conveyor belt, and a third photo-eye and reflector combination, PE3 165 is positioned on the reject conveyor belt to ensure that packages are correctly rejected. References to "photo-eye" include a reflector where the context of use so implies.

The integrity system logic 150 receives accept and reject signals from the measurement system logic 120 in addition to signals generated by the photo-eyes when detecting a package. These signals, combined with the photo-eye signals provide the integrity system logic with sufficient information for making multiple decisions.

Each photo eye has one or more of these decisions or functions associated with it to assist in the integrity checking. The photo-eye PE1 155, mounted over the weighing area of the checkweigher signals the presence of a pack. This signal is used to check for pack skew and spacing. The integrity system forces a reject for any packs skewed or spaced such that weighing might be impaired and, for others, it checks for a corresponding "decision" output from the checkweigher. No "decision" from the checkweigher indicates that a pack was not weighed, causing the system to raise a fault condition.

The "accept" and "reject" outputs from the checkweigher indicate a decision to process the pack down one of two possible paths. Photo-eyes 160 and 165 across each of those paths check that the pack is indeed present in the correct location within the correct time-frame. Absence of the pack where expected causes a fault condition, presumed to be a failure of the reject device. These same photo-eyes are also checked by the system for any permanent blockage condition indicative of a jam or back-up in the reject zone. Additional integrity system function keeps track of consecutive reject counts, monitors air pressure and sensor state in order to identify other conditions of concern. The integrity system also maintains a running count of each condition identified.

By using a processor totally independent of the checkweigher, the integrity checker is expected to identify multiple possible conditions. While some checkweighers are designed to detect similar conditions, the integrity checker ensures that the checkweigher is operating correctly. Reject operation verification is performed by checking the reject did operate when it should, and didn't when it shouldn't. No-gap detection is performed by checking there is sufficient gap between packages for the checkweigher to weigh accurately. Pack skew detection involves checking to see if a package is presented skewed such that the "flow dimension" the checkweigher needs to deal with is too long to allow the pack to be weighed accurately. Pack "training" detection checks for continuous back-to-back product flow. Low air pressure detection determines whether the air pressure to the reject device is adequate at all times to ensure it's ready and able to operate if required.

Further checks include ten consecutive rejects detection. This involves checking for possible line conditions or checkweigher failures that might create a "continuous" reject condition. Ten of thirty packs rejected detection checks for production conditions, such as a defective bagger on a two or three bagger-fed line, which might result in a significant proportion of production being rejected, but not consecutively.

Checkweigher "On and active" test and Photo-eye test provide for checking that for every pack that is seen coming to the checkweigher a corresponding 'decision' is seen from the checkweigher. Line back-up detection is used to check for a back-up of product downstream of the checkweigher that would prevent proper checkweigher operation if it extended across the checkweigher. A reject bin overflow check determines whether a back-up of product in the reject zone has occurred, which might prevent a defective product from being properly rejected.

Checkweighing zone back-up is a check for products jammed up in the checkweighing zone or training across the checkweigher. Failure checking of any of the photo-eyes added as part of the integrity checking system arrangement determines whether any of the photo-eyes is not operating correctly.

The integrity checking system is supplied housed in a panel (overall dimensions 20 inches wide, 30 inches high, 9 inches deep) in one embodiment. Three photo-eyes, three reflectors and an air-pressure switch are also provided in a kit form. A stack light/alarm adds 11.5 inches additional height to the panel. Mounting centers for the panel are 14 inches across and 31.5 inches up/down. Incoming power to the integrity checker panel itself is 120VAC, 15A capacity (typical actual current draw=0.5 amps). System response, as measured by PLC scan time, is maximum 5 mS. Worst case resolution for the no-gap and pack skew features can thus be defined as: Resolution (in inches)=0.001× Belt Speed (in feet/minute). It should be noted that the dimensions may be easily modified, and that timing numbers may also be modified corresponding to package sizes, conveyor speeds, and other factors as desired.

Figure 2:
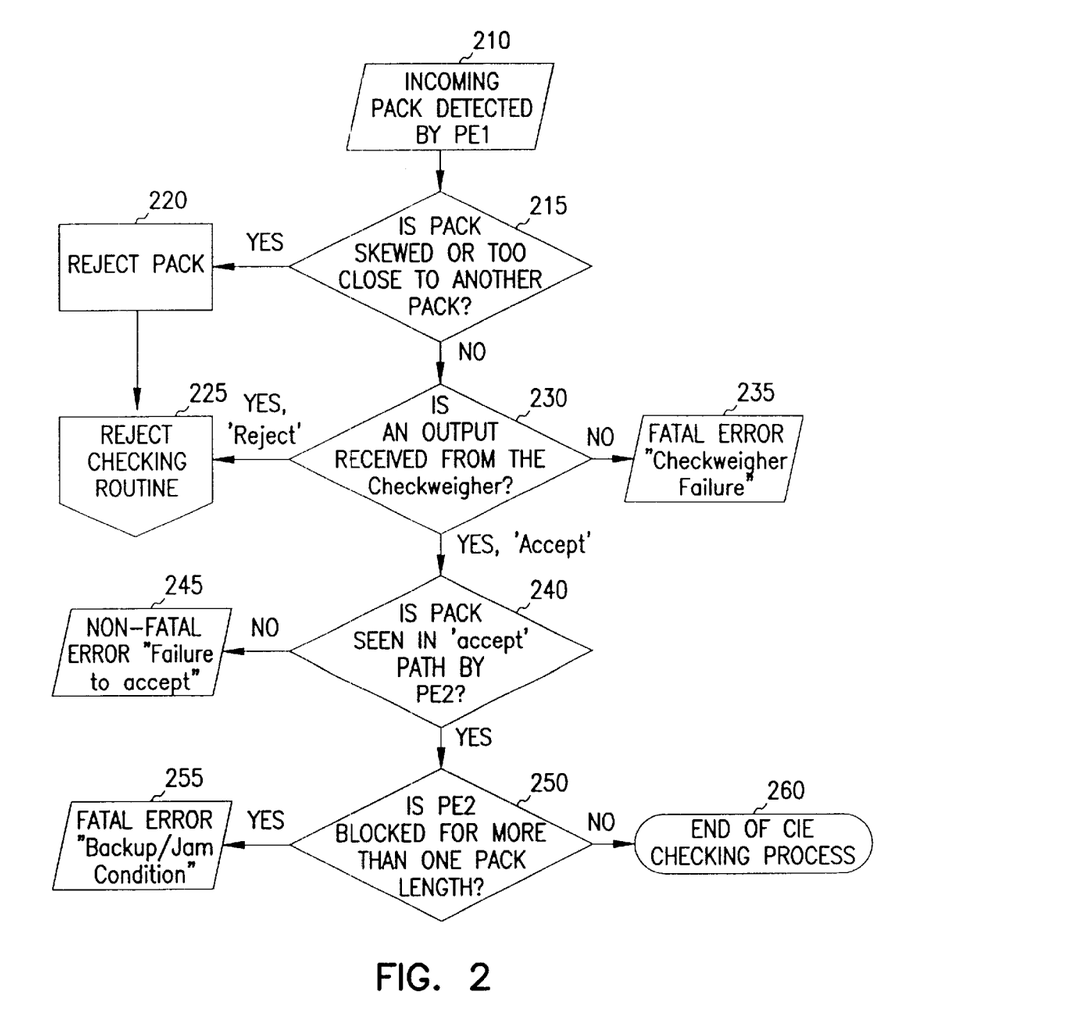
FIG. 2 is flowchart of the general operation of the integrity system of FIG. 1.

The flow chart of FIG. 2 shows the order of the main checks carried out by the integrity system as a pack is processed by the checkweigher. In one embodiment, six sets of registers are used to keep track of up to six packs traveling through the measurement system. The registers are used to keep track of the timing of packages and the decisions made with respect to the packages for the integrity system logic 150.

Figure 3:
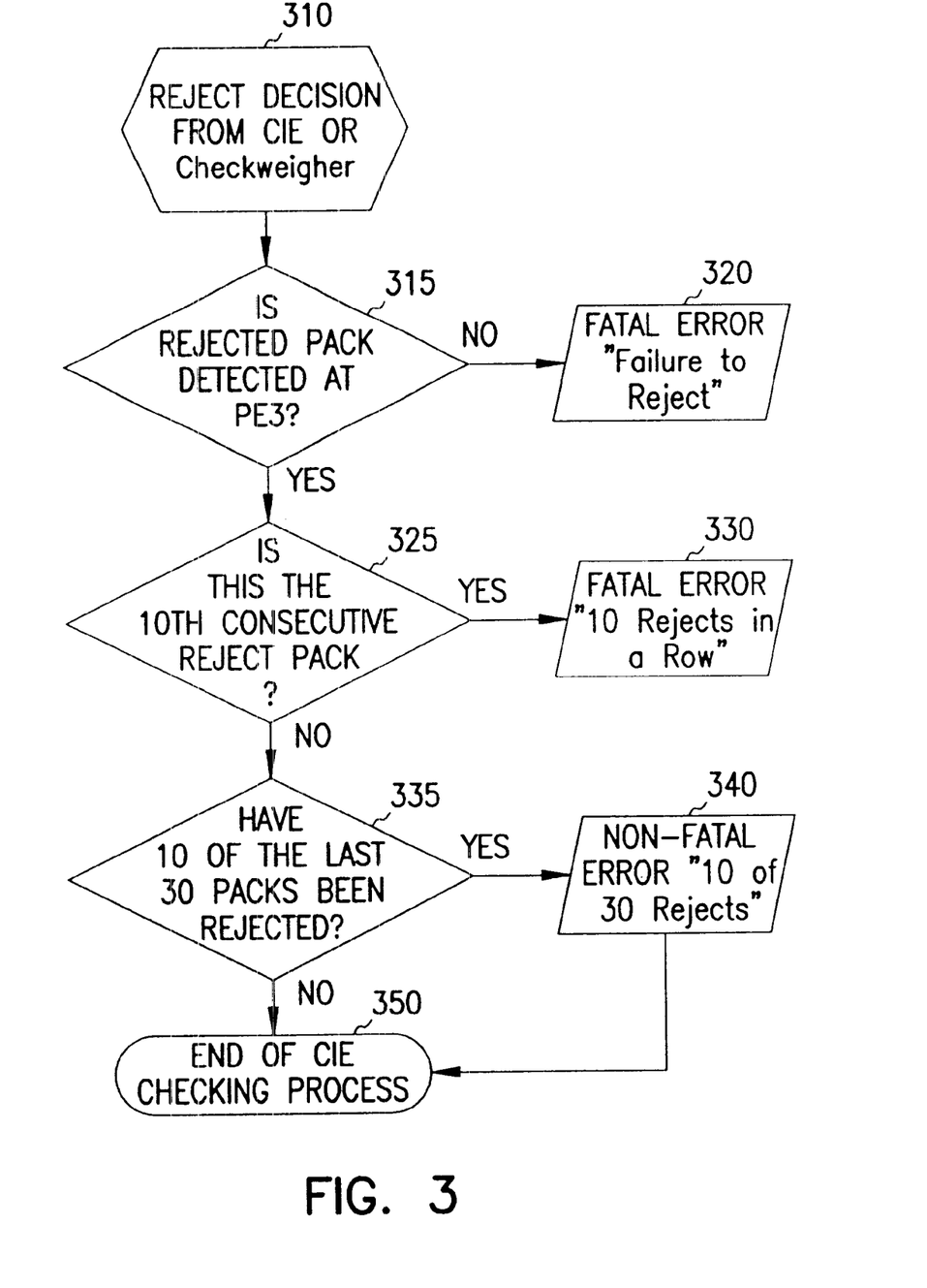
FIG. 3 is a flowchart of the operation of the integrity system with respect to the rejection of a package.

In FIG. 2, an incoming pack is detected by PE1 at 210. Based on the length of time that PE1 detected the pack, a determination is made at 215 regarding whether the pack is skewed or, based on the length of time between detection of packs, whether the pack was too close to another pack. If either is affirmative, the pack is rejected at 220, and a reject checking routine described with reference to FIG. 3 is entered at 225. If the pack was correctly positioned, a check is made to determine whether the accept signal was received from the checkweigher at 230. A received reject signal corresponds to the checkweigher determining that the pack should be rejected, and the reject checking routine is entered at 225. If no signal is received within a sufficient amount of time, a fatal error message is generated at 235, such as "Checkweigher Failure".

If an "accept" signal is detected at 230 from the checkweigher, a further check is made to determine whether the pack is seen in the accept path of the conveyor by the second photo-eye, PE2. If not, a message is generated at 245 indicating that there was a "Failure to Accept" a pack that was within an acceptable weight range. If the pack was seen at 240, a determination is made at 250 regarding whether a pack is blocking PE2 for more than the time a single pack should block it during normal movement along the conveyor. If yes, a fatal error message indicating that there is a "Backup/Jam Condition" is generated at 255. If no, the checking process is ended for that particular pack.

Each pack results in this algorithm being executed. Since up to six packs in this embodiment may be on the checkweigher portion of the conveyor at any point in time, six of these routines may be operating at the same time in different states. In a software embodiment, this may correspond to six threads running at the same time.

The reject routine of FIG. 3 begins with a reject decision from the integrity checker or from the checkweigher at 310. A determination is first made at 315 regarding whether the rejected pack was detected by PE3, the photo-eye in the reject path. If not, a fatal error message is generated at 320, "Failure to Reject". If yes, a determination regarding whether it is the tenth consecutive pack rejected at 325. If yes, a fatal error message is generated at 330 indicating "Ten Rejects in a Row". If no, a determination is made at 335 whether ten of the last thirty packs have been rejected. If yes, a non-fatal error message is generated indicating "Ten of Thirty Rejects". If no, the reject decision checking process ends at 350. It should be noted that the process also ends following the messages generated at 320 and 330 for each pack engendering a reject decision. The software and electrical design facilitates the addition of a second photo-eye at 315 to accommodate embodiments where identification of the rejected package cannot be assured with a single point of detection.

Figure 4:
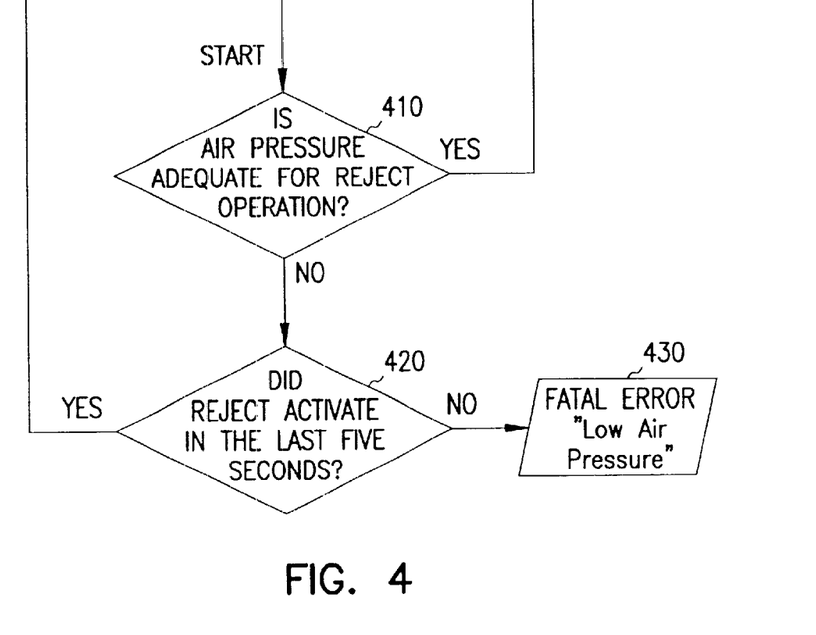
FIG. 4 is a flowchart of the operation of the integrity system with respect to detection of adequate pressure.

Air pressure is also checked by the checking logic. A measure of the air pressure is provided by the checkweigher system in one embodiment to the integrity checker at decision block 410 in FIG. 4. In further embodiments, a separate sensor directly coupled to the integrity checker provides an indication of the adequacy of the air pressure to ensure sufficient air pressure is present to properly reject packs. If the air pressure is adequate, the pressure is checked again after a predetermined period, or is continuously checked in an analog type system. If the air pressure is not adequate, a determination is made at 420 whether a reject occurred in the last five seconds at 420. A yes indication is interpreted to mean that the air pressure is recharging and should be given further time to reach adequate pressure. If the air pressure is not adequate, a fatal error is generated indicating that there is "Low Air Pressure" at 430.

Figure 5:
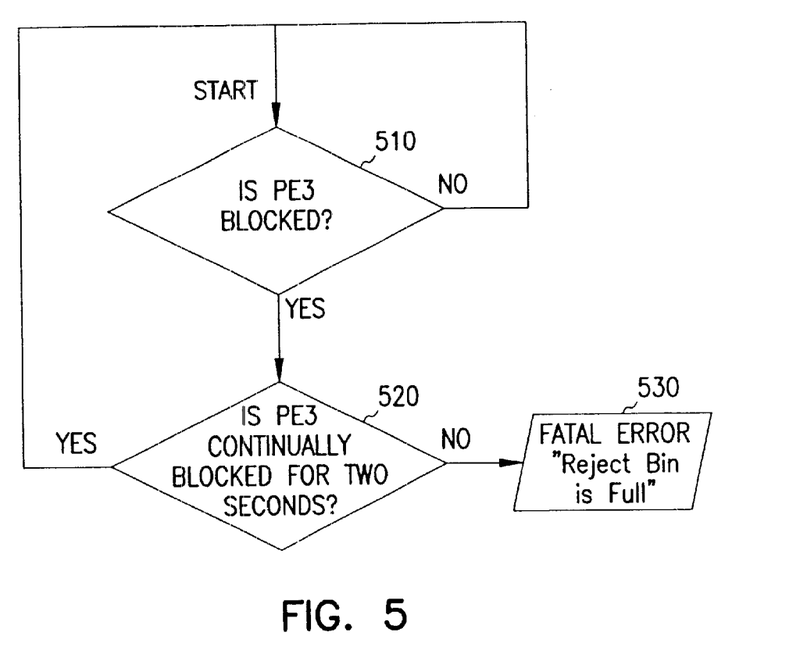
FIG. 5 is a flowchart of the operation of the integrity system with respect to detection of a full reject bin.

A full reject bin check is performed and shown in the flowchart of FIG. 5. Starting at decision block 510, a check is made to determine whether the third photo-eye, PE3 is blocked, as indicated by a pack blocking the photo-eye for a longer time than expected. If not blocked, continued monitoring occurs for later blocks. If blocked, a check is made at decision block 520 to determine whether PE3 is blocked continually for two seconds. If not, the routine is started again at 510. If yes, a fatal error is generated at 530 indicating that the "Reject Bin is Full".

Figure 6:
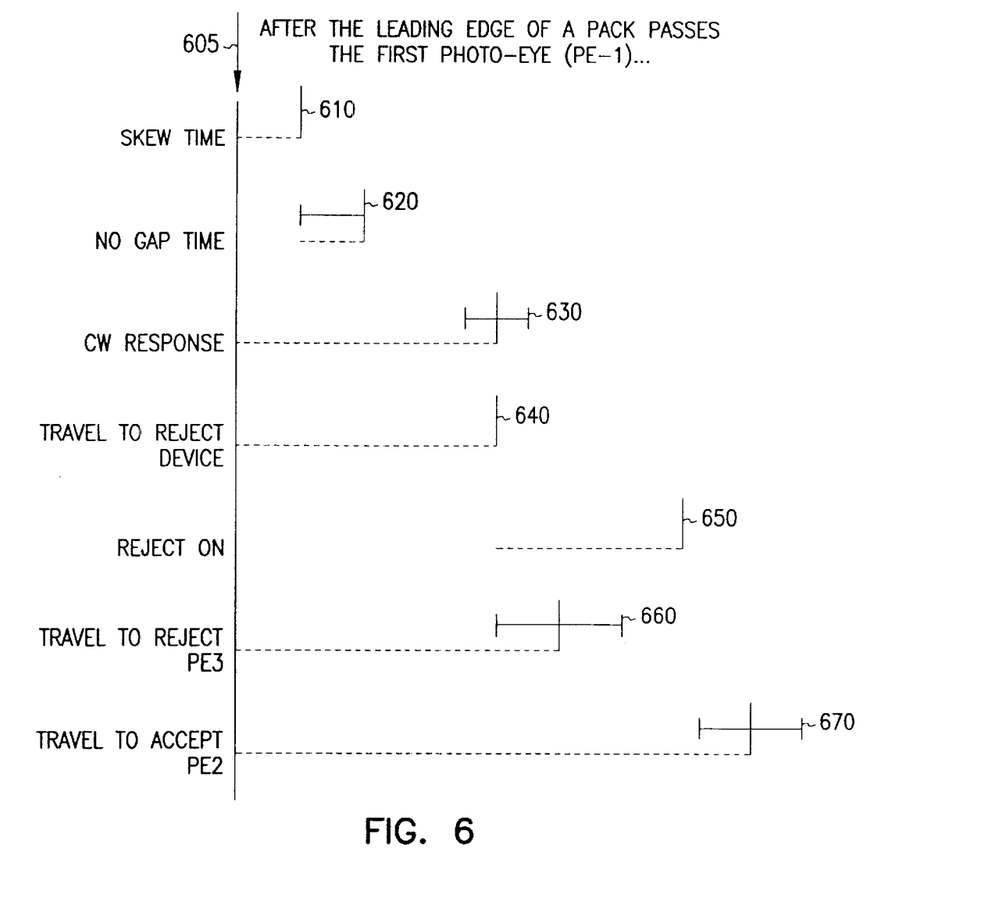
FIG. 6 is a timing chart for operation of the integrity system of FIG. 1.

A timing chart is provided in FIG. 6 shows how individual timer values representing time windows for the integrity checker work together over an approximately 2000 millisecond timeframe. Horizontal dashed lines and larger vertical lines represent time values entered at set up, and based on pack size, desired pack spacing, and conveyor velocity, as well as path lengths for the checkweigher. Vertical line 605 indicates a time when a leading edge of a pack encounters the first photo-eye, PE1. Time 610 indicates the expiration of a timer corresponding to when the pack should no longer be detected by PE1. A pack that is skewed too much, will still be blocking PE1 after the timer expires, and will result in a pack skew fault being logged. A "no gap time" timer is shown at 620, and begins after trailing edge of the pack no longer blocks PE1. It expires at a point at which a new pack is sufficiently spaced from the first pack to enable accurate weighing of the packs. If PE1 is blocked again during period 620, a no Gap fault is logged.

At 630, a time window for detecting an accept or reject signal from the checkweigher is indicated. During this time window, either an accept or reject signal should be received from the checkweigher, or a "checkweigher response" fault is logged. At time 640, a reject solenoid should be energized to move the pack into the reject bin if a pack skew or no gap fault was logged. It will stay energized until time 650. At time window 660, if a reject decision was received from the checkweigher or a pack skew or no gap determination was made, then PE3 should detect this pack being discharged from the conveyor by the rejection within this time window, or a "pack not rejected" fault is logged. At time window 670, if an accept decision was received from the checkweigher, then PE2 should detect the pack continuing down the conveyor within the window, or a "pack not accepted" fault is logged.

Messages generated by the integrity checker are logged and displayed in one form or another to users. Messages may also result in actions taken, such as shutting down the conveyor to avoid damage to product and the checkweigher system.

The integrity checker automatically starts up when power is applied and the checkweigher is running. The only requirement for operator intervention is to acknowledge and reset an alarm condition. Actions carried out by the integrity checker fall into three categories "Fatal"—Alarm sounds and strobe light flashes until reset. Line shuts down. Alarm acknowledgement and reset of system are required for all "Fatal" conditions before the line can be restarted. The line cannot be restarted, and the integrity checker will not sense further conditions, until reset with the F1 key or other mechanism, such as clicking on an icon on a graphic display. Any packs stopped on the checkweigher should be removed and hand weighed or re-fed. Fatal conditions include: Line back-up; Low air pressure; Pack not rejected; Reject area overflow; Checkweigher zone back-up; Checkweigher failure; Photo-eye failure; 10 consecutive rejects.

"Non-fatal"—Strobe light flashes until reset. Alarm acknowledgement and reset of system are required for all "Non-fatal" conditions. While the line can be run, the strobe light will not stop flashing until reset with the F1 key. Non-fatal conditions include: Pack not accepted; 10 of 30 rejects.

"Warning"—Offending pack is automatically rejected and strobe light flashes for about 6 seconds then resets itself. No alarm acknowledgement is required; these alarms will be automatically acknowledged after six seconds. Warning conditions include: Package skew; No-gap between packages; packs training/touching. Any fault condition identified will be shown at the top of the PanelView display in reverse video until that fault is acknowledged/cleared. Any fault display is cleared from the PanelView display by pressing F4; any alarm or line shutdown output is reset by pressing F1.

Figure 7:
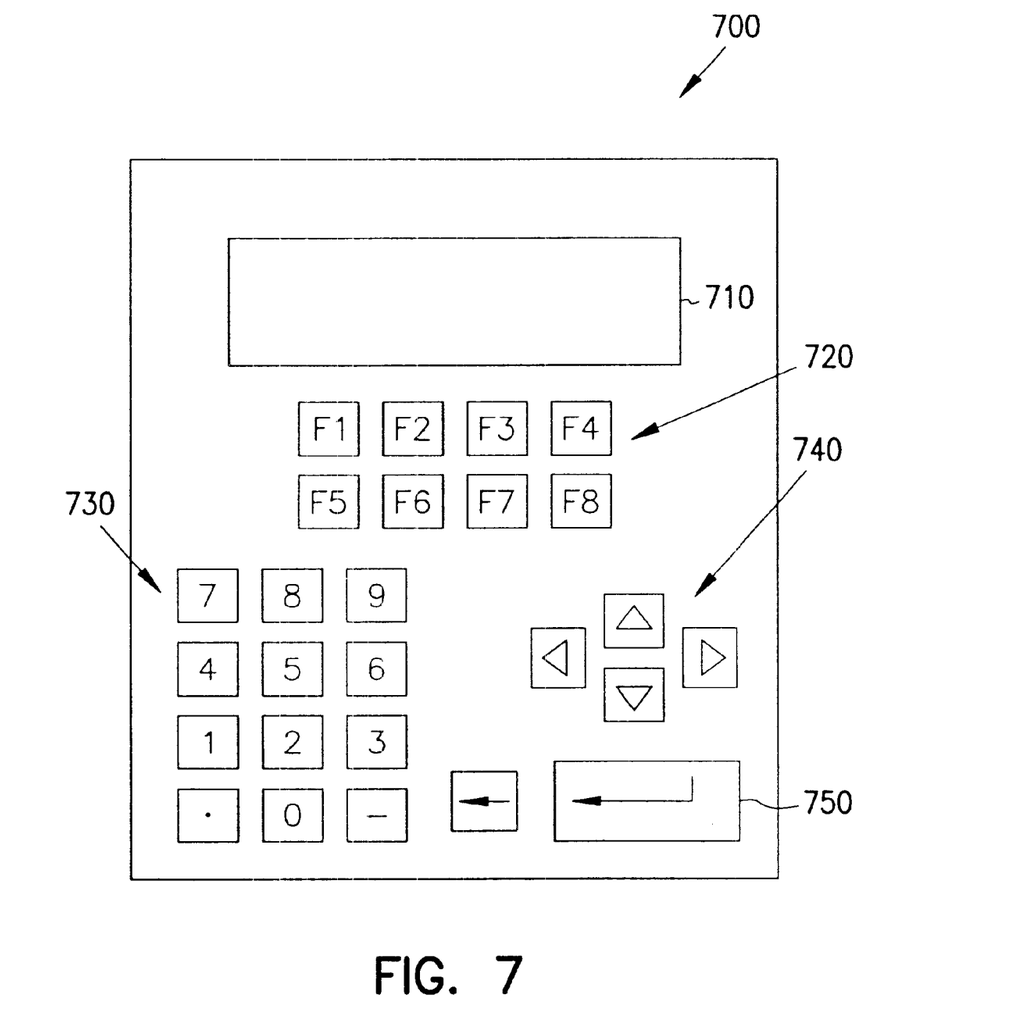
FIG. 7 is a diagram of an input/output panel for the integrity system of FIG. 1.

All operator interface with the integrity checker is carried out via a view panel shown at 700 in FIG. 7. The view panel is part of panel containing the elements of the integrity checker. The view panel may also be configured as a remote device using wireless communication capabilities to communicate with the integrity checker. View panel 700 comprises a display 710, which is a LCD type of display in one embodiment. Other displays may also be used as desired. A set of function keys 720 on the view panel initiate selected functions. A numeric keypad 730 provides the ability to set values and enter passwords. Scroll keys 740 provide the ability to scroll up and down through alarm history, and an enter key 750 provides for entering of values into the integrity system from the keypad.

Functions initiated by the function keys 720 are described corresponding to function key labels in FIG. 7, F1 through F8:

F1—When viewing the Alarm History log (see F8) clears the contents. Alarm outputs are reset, or the alarm history is cleared. At all other times, F1 resets the Audible alarm, Strobe light and line shutdown outputs.

F2—From a main menu, provides access to a function allowing the counters to be reset (password protected). At other times, used for editing and entering passwords (see later sections); this key is not used in normal daily operation.

F3—From the main menu, provides access to the maintenance area where the internal system timers can be viewed or changed (password protected). At other times, used for editing and entering passwords (see later sections); this key is not used in normal daily operation.

F4—At all times, acknowledges an alarm condition and clears it from the display.

F5—At all times, returns the user to the main menu.

F6—At all times, moves to the next appropriate screen in a sequence (see later sections).

F7—At all times, toggles between the current screen and the previous screen in a sequence (see later sections).

F8—At all times, provides access to the Alarm History log—most recent alarm is at the top, the up and down arrows can be used to scroll through the log.

In its normal, no fault, condition, the display 710 will typically show "CHECKWEIGHER ON" with the checkweigher running, or "CHECKWEIGHER OFF" if not running, along with a list of commonly used function keys. When a fault condition has been identified, as well as the strobe light flashing above the system, the nature of the fault will be shown on the display in reverse video. If the display is not cleared with the F4 key, then the oldest fault is displayed. As the F4 key is pressed, the oldest fault is cleared to reveal the next oldest until eventually the most recent fault is displayed. The function keys may be reconfigured to correspond to different functions.

The following table is a list of system faults displayable (in reverse video) relating to checkweigher conditions and the probable meaning of each. A type of "W" results in a warning with a strobe light flashing for six seconds. No acknowledgment is required. A type of "F" is a fatal error resulting in a line shutdown, alarm and strobe. This condition must be acknowledged and fixed, and the integrity checker must be reset. A type of "N" is a nonfatal fault, and a strobe flashes until reset.

| Fault | Type | Description |
|---|---|---|
| PACK SKEW | W | Pack skewed or packs touching. |
| INSUFFICIENT GAP | W | Not enough gap between packs. |

-continued

| Fault | Type | Description |
|---|---|---|
| CW RESPONSE FAULT | F | No decision from checkweigher; checkweigher failure? |
| CW LOCKED ON | F | Permanent "accept" output from checkweigher; checkweigher failure? |
| CW LOCKED OFF | F | Permanent "reject" output from checkweigher; checkweigher failure? |
| AIR PRESSURE FAULT | F | No air pressure to reject device. |
| 10 REJECTED IN A ROW | F | 10 consecutive packs were rejected (over, under, skew, no-gap or a combination). |
| 10 OF 30 REJECTED | N | 10 of the last 30 packs were rejected (over, under, skew, no-gap or a combination). |
| PACK NOT REJECTED | F | Pack was detected as over or under by the checkweigher, but not rejected; reject device failure? PACKS SHOULD BE REMOVED FROM OUTFEED CONVEYOR WHEN THIS FAULT OCCURS. |
| PACK NOT ACCEPTED | N | Pack was detected as correct weight by the checkweigher, but not seen exiting the checkweigher zone. |
| PE1 FAILURE | F | Jam-up within the checkweigher weighing area. |
| LINE BACKUP | F | Jam-up at the exit of the checkweigher zone. |
| REJECT BIN OVERFLOW | F | Backup in reject bin so much that no more packs can be rejected. |

The integrity checker maintains counters for all conditions it identifies. The counters continue to accumulate until reset, or they hit their upper limit, 999,999,999 in one embodiment. Access to the counters is provided by function key F6 from the main menu, and F6 again until the desired counter is found. A PLC Fault Code in the counter list is actually an indication of the type of any current fault as opposed to a counter. A rejected packs count is the total of all packs rejected, those caused by the checkweigher (under-weights and over-weights) and those caused by the integrity checker including touching packs, skewed packs and packs too close to each other.

Although all alarms are cleared from an alarm banner at the top of the screen (F4), the most recent 100 are also logged in a history log. This log can be accessed by pressing F8 from the main menu (the main menu can be accessed from any other screen by pressing F5). In the alarm history log, the most recent alarm condition is at the top of the list. The list can be scrolled through by operating down-arrow and up-arrow buttons on the keypad. Each alarm (up to 100), since the last time the history log was cleared, will be shown along with the time it occurred (in the last 24 hours).

The system fault counters described in the previous section can all be reset to zero at any time. From the main menu (the main menu can be accessed from any other screen by pressing F5), press F2. The display will ask for a password. To enter the password, first press F2 again, then, using the numeric keypad, enter the three digit password and press the ENTER key. Provided the correct password was entered, the display will confirm this action with "All Counters Reset to 0".

The entire contents of the Alarm History log can be cleared at any time. While viewing the Alarm History log (F8 from the main menu), press F1. The display will ask for confirmation of this action by pressing F2 or aborting it by pressing F1. When confirmed, the log will be cleared and the screen will be blank. Press F5 to return to the main menu.

Setup

PE-1 and its reflector should be positioned to look across the checkweigher transport system (usually chains) in a location similar to a potentially existing photo-eye (which performs pack location for the checkweigher itself). PE1 does not, however, have to be at the exact same position as the checkweigher photo-eye; positioning is not critical provided it always sees product entering the weighing zone. PE1 will also check for package skew and correct package spacing.

PE-2 and its reflector should be positioned in the path that good product will travel after the reject device such that any package seen by this photo-eye can be said to have not been rejected. This photo-eye will also identify any back-up condition that occurs so any existing photo-eyes performing the same purpose can be removed (assuming they perform no other purpose also).

PE-3 and its reflector should be positioned to look across the reject path such that any package seen by this photo-eye can be said to have been clearly rejected and not at risk of being inadvertently packed. Since a pack which should be rejected but does not trip this photo-eye will cause a line shut-down it is important to select a position which will always see a rejected pack. The addition of a reject chute to the checkweigher may assist as this will guide product in a consistent path, passed the photo-eye. It may also be advantageous to use a vertical photo-eye orientation here. When testing for a good photo-eye position, it is important to consider the reject path of both empty and filled packings as the change in weight can have a significant effect on the way the package moves during rejection. The final photo-eye positioning should be such that there will never, in normal production, be more than six packages in motion between PE-1 and either PE-2 or PE-3. Where more registers are provided in other embodiments, there may be a potential for a corresponding number of packages in motion.

The integrity checker requires three inputs from, and one output to, the checkweigher circuitry in one embodiment.

Accept pack—A checkweigher output to indicate a pack was processed and found to be within the defined weight tolerances. This output, while available on most checkweighers, may not be physically present in the existing checkweigher configuration and then will have to be added as a retrofit by the checkweigher manufacturer before the integrity checker installation can be completed.

Reject pack—A checkweigher output to indicate a pack was processed and found to be either overweight, underweight or to be rejected for some other purpose (such as a checkweigher identified fault). The existing "Reject" output can usually be used for this purpose.

Checkweigher running—A signal from the checkweigher to indicate the conveyors are running. This can be provided by the checkweigher manufacturer as a retrofit also, or can simply be obtained from the existing motor start circuit. This signal enables the integrity checker so, if not available, this input to the integrity checker should be permanently linked out.

Force reject—An output from the integrity checker to drive the existing checkweigher reject to allow the integrity checker to force the reject of any pack which, due to skew or spacing problems, would likely be weighed incorrectly.

The three input signals can each be accepted as either 120VAC or 24VDC simply through selection of the appropriate integrity checker input during installation. Other signals levels may also be used, including digital wireless signals.

All set-up of the integrity checker itself is carried out via the keypad and display on the view panel user interface in one embodiment. Before this is attempted, all photo-eyes should be positioned and set-up to accurately detect packs at appropriate locations. The checkweigher "accept pack" output timing must also have been set to the same value as the "reject pack" delay timer. Set-up of various timer values which are determined by the belt speeds in use, the pack dimensions, the checkweigher characteristics and the exact location of photo-eyes and reject device.

Example calculations for timers are shown to help determine possible timer values to use along with descriptions of tests which can be carried out to determine if those values are correct, or need adjustment.

To access the maintenance list on the integrity checker to set timers: From the main menu (the main menu can be Accessed from any other screen by pressing F5), press F3. The display will ask for a password. To enter the password, first press F3 again, then, using the numeric keypad, enter the four digit password and press the ENTER key. Provided the correct password was entered, the display will confirm this action and indicate that the password protection can be restored by entering 0 (zero) on the numeric keypad (after first pressing F3) from this screen. NOTE: After ten minutes of no activity at the keypad, the password will automatically be restored. Pressing F6 (next screen) will move to the first timer. From each timer entry screen, the next timer can be seen by again pressing F6. Pressing F7 will toggle between the current and the previous screens. At the end of the timers list, pressing F6 again will return to the top of the list. Pressing F5 will return to the main menu (password protection of the timers will automatically be reset after ten minutes).

Timer values can be changed by pressing F2 followed by the new timer value (via the numeric keypad) and the ENTER key. All timer values are entered in milliseconds. All calculations shown below require dimensions in inches, belt speeds in feet/minute and will yield a suggested timer entry in milliseconds.

| TIMER: SKEW TIME; | |
|---|---|
| Description: | The amount of time the first photo-eye (PE-1) is expected to be blocked by a pack during normal operation. If the photo-eye is blocked for longer than this time then the pack will be rejected and a "Pack Skew" fault will be logged. |
| Calculation: | Pack Flow Dimension x 6250 / Belt Speed |
| Test: | Pass a correct weight pack across the checkweigher with no skew - it should be accepted. Pass the same pack with the amount of skew you wish to be detected and it should be rejected and a "Pack Skew" fault should be logged. To make skew detection more sensitive, reduce the timer value; to make it less sensitive, increase the timer value. NOTE: During testing, reject time may be wrong - this can be corrected with the "Travel to Reject Device" timer which can now be set. |

| TIMER: NO GAP TIME; | |
|---|---|
| Description: | The amount of time the first photo-eye (PE-1) is expected to be unblocked between packs during normal operation. If the photo-eye is unblocked for less than this time then the two packs will be rejected and an "Insufficient Gap" fault will be logged. |
| Calculation: | (Checkweigher Weigh-table Length – Pack Flow Dimension) x 5000 / Belt Speed |
| Test: | Pass two correct weight packs across the checkweigher with a pitch (leading edge to leading edge dimension) slightly greater than the weigh-table length. Both should be accepted. Pass the same packs with a pitch less than the weigh-table length and the first one should be rejected and |

-continued an "Insufficient Gap" fault should be logged. To make no-gap detection more sensitive, increase the timer value; to make it less sensitive, decrease the timer value. NOTE: During testing, reject timing may be wrong - this can be corrected with the "Travel to Reject Device" timer which can now be set.

TIMER: CW RESPONSE;

Description: The amount of time between the first photo-eye (PE-1) seeing a pack and a response being received from the checkweigher to indicate either "accept" or "reject". If no output is received from the checkweigher in time, a "CW Response" fault will be logged. The system automatically applies a window of ±70 mS around the entered value.
Calculation: It is recommended that this timer initially be set to the same value as the "Travel to Reject Device" timer, after that timer has been set (see below).
Distance from PE-1 to Reject Device × 5000
Belt Speed
see note regarding multiple diferent belt speeds
Test: Pass a good pack across the system and it should be processed with no "CW Response" fault. Break the beam of PE-1 with your finger, without breaking the beam of the checkweigher photo-eye itself, and a "CW Response" fault should be logged. Increase or decrease the timer value in 70 mS increments to perfect.

TIMER: TRAVEL TO REJECT DEVICE;

Description: The amount of time between the first photo-eye (PE-1) seeing a pack and a signal being required to drive the reject device, if that pack is to be rejected by the integrity checker.
Calculation: Distance from PE-1 to Reject Device × 5000
Belt Speed
see note regarding multiple diferent belt speeds
Test: Pass a correct weight pack across the checkweigher with a significant amount of skew. It should be rejected. To make the reject device operate later, increase the timer value; to make it operate earlier, decrease the timer value. Repeat with two packs with insufficient gap between them and adjust as necessary. Repeat this test and adjust as necessary after the "Reject On" timer has been set.

TIMER: TRAVEL TO ACCEPT PE2;

Description: The amount of time between the first photo-eye (PE-1) seeing a pack and that pack being seen by the "pack accepted" photo-eye (PE-2), if appropriate. If the "pack accepted" photo-eye doesn't see an accept weight pack in time, a "Pack Not Accepted" fault will be logged. The system automatically applies a window of ±100 mS around the entered value.
Calculation: Distance from PE-1 to PE-2 × 5000
Belt Speed
NOTE: This time value should typically be no less than the value of the "CW Response" time entered, plus 170 mS. It should also be expected to be no less than the "Travel to Reject Device" timer entered, plus 100 mS.
see note regarding multiple diferent belt speeds
Test: Pass a correct weight pack across the checkweigher and it should proceed down the line without being rejected and without a "Pack not Accepted" fault being logged. Pass the same pack over the checkweigher but remove it from the line after weighing, but before the "pack accepted" photo-eye, and a "Pack not Accepted" fault should be logged. Increase or decrease the timer value in 100 mS increments to perfect.

TIMER: TRAVEL TO REJECT PE3;

Description: The amount of time between the first photo-eye (PE-1) seeing a pack and that pack being seen by the "pack rejected" photo-eye (PE-3), if appropriate. If the "pack rejected" photo-eye doesn't see a reject pack in time, a "Pack Not Rejected" fault will be logged. The system automatically applies a window of ±150 mS around the entered value.

-continued

Calculation: (Distance from PE-1 to Reject Device + Belt Width) × 5000
Belt Speed
NOTE: This time value should typically be no less than the value of the "CW Response" time entered, plus 220 mS. It should also be expected to be no less than the "Travel to Reject Device" timer entered, plus 150 mS.
see note regarding multiple diferent belt speeds
Test: Pass an under or overweight pack across the checkweigher and it should be rejected without a "Pack not Rejected" fault being logged. Pass the same pack over the checkweigher but remove it from the line after weighing, but before the reject device, and a "Pack not Rejected" fault should be logged. Increase or decrease the timer value in 150 mS increments to perfect. This test should be conducted multiple times with both heavy (double weight) and light (empty) packs.

TIMER: REJECT ON;

Description: The amount of time the reject is activated by the integrity checker for a skewed pack or insufficient gap condition.
Calculation: Start with the same value used in the checkweigher for the under and overweight reject "dwell" or "duration".
Test: Pass a correct weight pack across the checkweigher with a significant amount of skew. It should be cleanly rejected. To make the reject device operate for more time, increase the timer value; to make it operate for less time, decrease the timer value. Repeat with two packs with insufficient gap between them and adjust as necessary ensuring other packs are not partially rejected, or skewed. This timer works in conjunction with the "Travel to Reject Device" timer.

For calculations above where a distance is required to be measured, if that distance covers two conveyors (checkweigher conveyor and outfeed conveyor) running at different speeds the following approach will yield a more accurate result:

With the conveyors stopped, place a package half-way across the gap where the two conveyors interface. Measure the distance from the "Incoming Pack" photo-eye (PE-1) to the leading edge of the pack; this will be referred to as distance$_1$. Now measure the distance from the leading edge of the pack to the other point called out in the calculation (PE-2 or Reject Device); this will be referred to as distance$_2$.

The appropriate timer calculations can now be calculated as two times added together as follows:

"Checkweigher Response", "Travel to Reject" and "Travel to Accept PE2" timers:

$$\frac{\text{Distance}_1 \times 5000}{\text{Checkweigher Belt Speed}} + \frac{\text{Distance}_2 \times 5000}{\text{Outfeed Belt Speed}}$$

"Travel to Reject PE3" timer $$\frac{\text{Distance}_1 \times 5000}{\text{Checkweigher Belt Speed}} + \frac{(\text{Distance}_2 + \text{Belt Width}) \times 5000}{\text{Outfeed Belt Speed}}$$

Conclusion

An inspection equipment integrity system uses independent sensors and processing capabilities to determine the integrity of inspection equipment. The system further receives input from the inspection equipment regarding decisions made during inspection of the packages. The system uses the position information and inputs from the inspection equipment to determine the integrity of the inspection equipment.

The integrity system is described as being independent from the checkweigher. It should be noted that such independence merely requires that the logic and sensors operate independently of the checkweigher or other type of measurement device. Both may share a similar power supply and supporting physical structures. In other words, the logic and sensors may be mounted to physical components of the checkweigher while still maintaining such independence. Other sensors that accurately detect the presence of a pack or other item that is being measured may also be substituted, such as sonic based sensors, magnetic sensors or other sensors for the photo-eye sensors.

What is claimed is:

1. A measurement system integrity checking system, the checking system comprising:

integrity checking logic independent from measurement system logic;

an input that receives measurement system determination signals from the measurement system logic; and photo-eye sensors, for positioning along a conveyor having packs to be weighed by the measurement system, and coupled to the integrity checking logic for verifying proper operation of the measurement system.

2. The integrity checking system of claim 1 wherein a first sensor comprises a photo-eye that detects pack skew prior to weighing.

3. The integrity checking system of claim 2 wherein the first sensor further detects packs too closely spaced for proper weighing.

4. The integrity checking system of claim 1 wherein a second sensor detects whether a pack is properly traveling down a reject path on the conveyor.

5. The integrity checking system of claim 4 wherein second sensor further detects backups on the reject path on the conveyor.

6. The integrity checking system of claim 1 wherein a third sensor detects whether a pack is traveling down an accept path on the conveyor.

7. The integrity checking system of claim 6 wherein the third sensor detects whether the accept path on the conveyor is blocked.

8. The integrity checking system of claim 1 wherein the independent integrity checking logic is operable to generate multiple messages regarding the integrity of the measurement system.

9. The integrity checking system of claim 1 wherein the independent integrity checking logic is operable to shut down the conveyor.

10. The checking system of claim 1 and further comprising means for sensing whether a reject device on the conveyor has sufficient air pressure.

11. The checking system of claim 1 and further comprising means for generating messages regarding the integrity of the measurement system.

12. The checking system of claim 11 wherein the messages are selected from the group consisting of warnings, fatal errors and nonfatal faults.

13. The checking system of claim 1 and further comprising means for shutting down the conveyor.

14. The checking system of claim 1 and further comprising means for generating a message if ten packs in a row are rejected.

15. The checking system of claim 14 wherein the messages are representative of faults selected from the list consisting of pack skew, insufficient gap, checkweigher response fault, checkweigher locked on, checkweigher locked off, air pressure fault, ten rejected in a row, ten of thirty rejected, pack not rejected, pack not accepted, photo-eye failure, line backup, and reject bin overflow.

16. The checking system of claim 1 and further comprising means for generating a message if ten of the last thirty packs are rejected.

17. The checking system of claim 1 wherein the integrity checking logic comprises a computer having a display device, the computer receiving sensed information from the sensors, determining if a pack on the conveyor is skewed based on a length of time that the pack is sensed, determining if consecutive packs are too closely spaced to obtain a proper weight based on a length of time between sensing the consecutive packs; and providing a message independent of the checkweigher representative of such determinations.

18. A measurement system integrity checking system, the checking system comprising:

means for checking the integrity checking logic independent from measurement system logic;

means for receiving measurement system determination signals from the measurement system logic; and photo-eye sensors, for positioning along a conveyor having packs to be weighed by the measurement system, and coupled to the integrity checking logic for verifying proper operation of the measurement system.

19. A measurement system integrity checking system for a conveyor having packs being transported by the conveyor, the checking system comprising:

integrity checking logic independent from measurement system logic;

an input that receives measurement system determination signals from the measurement system logic; and photo-eye sensors, for positioning along the conveyor, and coupled to the integrity checking logic for verifying proper operation of the measurement system.

20. The checking system of claim 19 wherein the integrity checking logic comprises a computer having a display device, the computer receiving sensed information from the sensors, determining if a pack on the conveyor is skewed based on a length of time that the pack is sensed, determining if consecutive packs are too closely spaced to obtain a proper weight based on a length of time between sensing the consecutive packs; and providing a message independent of the checkweigher representative of such determinations.

* * * * *